US007128648B2

(12) United States Patent
Watanabe

(10) Patent No.: US 7,128,648 B2
(45) Date of Patent: Oct. 31, 2006

(54) GAME MACHINE AND METHOD FOR CONTROLLING THE GAME MACHINE

(75) Inventor: Katsuhiko Watanabe, Tokyo (JP)

(73) Assignee: Konami Corporation, Tokyo (JP)

( * ) Notice: Subject to any disclaimer, the term of this patent is extended or adjusted under 35 U.S.C. 154(b) by 719 days.

(21) Appl. No.: 10/230,065

(22) Filed: Aug. 29, 2002

(65) Prior Publication Data

US 2003/0045346 A1 Mar. 6, 2003

(30) Foreign Application Priority Data

Aug. 30, 2001 (JP) .......................... P2001-261335

(51) Int. Cl.
*A63F 13/00* (2006.01)

(52) U.S. Cl. .......................... 463/20; 463/16; 463/21; 273/139

(58) Field of Classification Search ................. 463/16, 463/20–22; 273/138.1, 138.2, 139, 143 R
See application file for complete search history.

(56) References Cited

U.S. PATENT DOCUMENTS

| | | | | |
|---|---|---|---|---|
| 6,033,307 A * | 3/2000 | Vancura | .......................... | 463/20 |
| 6,135,885 A * | 10/2000 | Lermusiaux | ................. | 463/20 |
| 6,155,925 A * | 12/2000 | Giobbi et al. | ................. | 463/20 |
| 6,159,097 A * | 12/2000 | Gura | .......................... | 463/20 |
| 6,254,481 B1 * | 7/2001 | Jaffe | .......................... | 463/20 |
| 6,309,299 B1 * | 10/2001 | Weiss | .......................... | 463/20 |
| 6,375,568 B1 * | 4/2002 | Roffman et al. | .............. | 463/26 |
| 2002/0010018 A1 * | 1/2002 | Lemay et al. | ................. | 463/20 |

FOREIGN PATENT DOCUMENTS

| | | | |
|---|---|---|---|
| GB | 2144644 A | * | 3/1985 |
| JP | 6-178847 A | | 6/1994 |
| JP | 6-327809 A | | 11/1994 |
| JP | 7-88225 A | | 4/1995 |
| JP | 9-56874 A | | 3/1997 |
| JP | 9-164236 A | | 6/1997 |
| JP | 11-244483 A | | 9/1999 |
| JP | 11-290502 A | | 10/1999 |
| JP | 2000-189558 A | | 7/2000 |
| JP | 2001-120726 A | | 5/2001 |
| JP | 2001-129254 | | 5/2001 |
| JP | 2001-145741 A | | 5/2001 |
| JP | 2001-170256 A | | 6/2001 |
| JP | 2001-212281 A | | 8/2001 |

* cited by examiner

*Primary Examiner*—John M. Hotaling, II
*Assistant Examiner*—Alex F. R. P. Rada, II
(74) *Attorney, Agent, or Firm*—Sughrue Mion, PLLC

(57) ABSTRACT

A game machine includes a first display, a second display and a game changer. A plurality of spinning reels, each reel having a plurality of symbols of a combination game are displayed on the first display. A role playing game in which a character as an object of operation for a player acts in a virtual field and aims at a predetermined target is displayed on the second display. The game changer changes a first game to a second game advantageous to the player on the first display, depending on whether or not the character as the operation object has achieved the predetermined target.

8 Claims, 4 Drawing Sheets

FIG. 2

| DESIGNATION | SYMBOLS THAT CONSTITUTE WINNING COMBINATION | REWARDS DURING NORMAL GAMING STATE |
|---|---|---|
| BB<br>RED7-RED7-RED7 |  | PAYOUT 15 GAMING TOKENS AND SHIFT TO BB GAME |
| BB<br>BLUE7-BLUE7-BLUE7 |  | |
| RB<br>BAR-BAR-BAR |  | PAYOUT 15 GAMING TOKENS AND SHIFT TO RB GAME |
| SMALL WINNING COMBINATION<br>WATER MELLON - WATER MELLON - WATER MELLON | 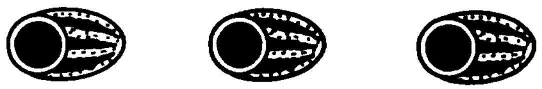 | PAYOUT 15 GAMING TOKENS |
| SMALL WINNING COMBINATION<br>BELL-BELL-BELL |  | PAYOUT 7 GAMING TOKENS |
| SINGLE WIN<br>CHERRY |  | PAYOUT 2 GAMING TOKENS |
| REPLAY<br>PLUM-PLUM-PLUM |  | REPLAY IN THE CONDITION AS SAME AS THE PREVIOUS GAME |

GAME MACHINE AND METHOD FOR CONTROLLING THE GAME MACHINE

BACKGROUND OF THE INVENTION

The invention relates to a game machine and a method for controlling the game machine. Particularly, the invention relates to a game machine which enables a beginner who has not mastered a special technique, such as a pinpoint stopping technique, to increase the number of acquirable game tokens by a technique for operating a game, as well as to a method for controlling the game machine.

An example of a related game machine will be described below with reference to a slot machine installed in an amusement arcade or a casino. A related slot machine has a predetermined number of spinning reels (e.g., three spinning reels) having various symbols printed thereon. The spinning reels, which are rotated by corresponding reel drive motors (e.g., stepping motors), are stopped at timings at which a player presses stop buttons corresponding to the respective spinning reels. When three symbols form a certain winning combination along at least one of the valid lines (i.e., winning lines) in the state of stopping the spinning reels, game tokens (tokens for payoff) corresponding to the winning combination are paid out or the right to play a bonus game is awarded to the player. A slot machine equipped with a liquid-crystal display has recently been available. When symbols that would form a small winning combination have been determined in advance through internal random selection or when symbols that would form a big bonus winning combination have been determined in advance through internal random selection, the result of determination is notified to the player by liquid-crystal presentation of story-like nature provided by the liquid-crystal display.

The related game machine provides liquid-crystal presentation of story-like nature by way of a liquid-crystal display. However, the presentation is a mere display of liquid-crystal screens from a predetermined story or a mere report of symbols that would form a small winning combination and have been determined in advance through internal random selection by a plurality of types of liquid-crystal presentations.

SUMMARY OF THE INVENTION

It is therefore an object of the present invention to provide a game machine, in which a player plays a game such that a character manipulated by the player performs action on a virtual field displayed on a liquid-crystal display; in which a result of an event on the game is reflected advantageously on a game status of the game machine, and which enables a player who has not mastered a special technique, such as pinpoint stopping action, to increase the number of acquirable game tokens by a technique for operating the game on the liquid-crystal display.

In order to achieve the above object, according to the present invention, there is provided a game machine comprising:

a first display, displaying a plurality of spinning reels, each reel having a plurality of symbols;

a second display, displaying a role playing game in which a character as an object of operation for a player acts in a virtual field and aims at a predetermined target; and a game changer, which changes a first game to a second game advantageous to the player on the first display, depending on whether or not the character as the operation object has achieved the predetermined target.

Preferably, the second game is a promotional game in which an amount of a payout being afforded is more than an amount of a payout of the first game.

Preferably, the game machine further comprising a first determinant, which determines whether the combinations formed with the symbols are at least one of winning combinations when the reels are stopped; and a payout controller, which pays game tokens when the symbols determined by the first determinant form at least one of winning combinations.

Preferably, the game machine further comprising an event generator, which generates an event to be encountered by the character.

In the configurations, when the event encountered by the character is cleared, the game changer changes the first game to the second game advantageous to the player. Hence, even a beginner player who has not mastered a pinpoint stopping technique or a like technique can change to the second game advantageous to the player, by a technique for operating the role playing game displayed on the second display. Consequently, the player can play the second game advantageous to the player, thereby enabling an increase the number of acquirable game tokens.

Here, it is preferable that, the game machine further comprising a first point addition controller, which adds a first point to a first parameter of the character when the symbols determined by the first determinant form at least one of winning combinations of symbols.

Here, as the first parameter increases, the chance of the role playing game being caused to progress becomes greater. One example is a physical strength level of a character which terminates the role playing game when the first parameter has become zero.

In the configuration, the combination game can be changed as a game which affects progress in the role playing game displayed on the second display. Further, a parlor or a casino where the game machines are installed can perform adjustment so as to maintain a balance between the combination game to be played on the first display of the game machine and the role playing game displayed on the second display. Hence, the player can be prevented from playing only the role playing game in an unbalanced manner.

Here, it is preferable that, the game machine further comprising a moving distance counter, which counts a moving distance of the character in the virtual field; and a point subtraction controller, which subtracts a second point from the first parameter of the character when the moving distance counter counts the moving distance of the character in the virtual field.

Here, it is preferable that, the event is a battle on the role playing game; and the game machine further comprising a second determinant, which determines whether an enemy character on the role playing game is defeated by the character through the battle; and a second point addition controller, which adds a third point to a second parameter of the character when the second determinant determinates the enemy character is defeated.

Preferably, the game machine further comprising a third determinant, which predetermines a winning combination of the symbols by an internal random selection; and a notice controller, which notifies the winning combination of symbols predetermined to the player by the third determinant when specific event is occurred in the role playing game.

In the configuration, the number of acquirable game tokens can be increased by the combination game to be played on the first display.

Preferably, the game machine further comprising a motor rotating the spinning reels displayed on the first display.

Preferably, the first display comprises an electronic display for displaying the spinning reels on a display screen.

According to the present invention, there is also provided a method of controlling a game machine comprising the steps of:

displaying a plurality of spinning reels in the game machine, each reel having a plurality of symbols of a combination game;

displaying a role playing game in which a character acts in a virtual field; and changing a first game to a second game advantageous to the player, in accordance with a result of the role playing game.

BRIEF DESCRIPTION OF THE DRAWINGS

The above objects and advantages of the present invention will become more apparent by describing in detail preferred exemplary embodiments thereof with reference to the accompanying drawings, wherein:

FIG. 2 is a descriptive view showing winning combinations of the slot machine;

DETAILED DESCRIPTION OF THE PREFERRED EMBODIMENTS

An embodiment of a slot machine which is an example of a game machine according to the invention will be described below in detail with reference to the accompanying drawings. In descriptions of the embodiment, a game machine and a method of controlling the game machine according to the invention will be described in detail.

Figure 1:
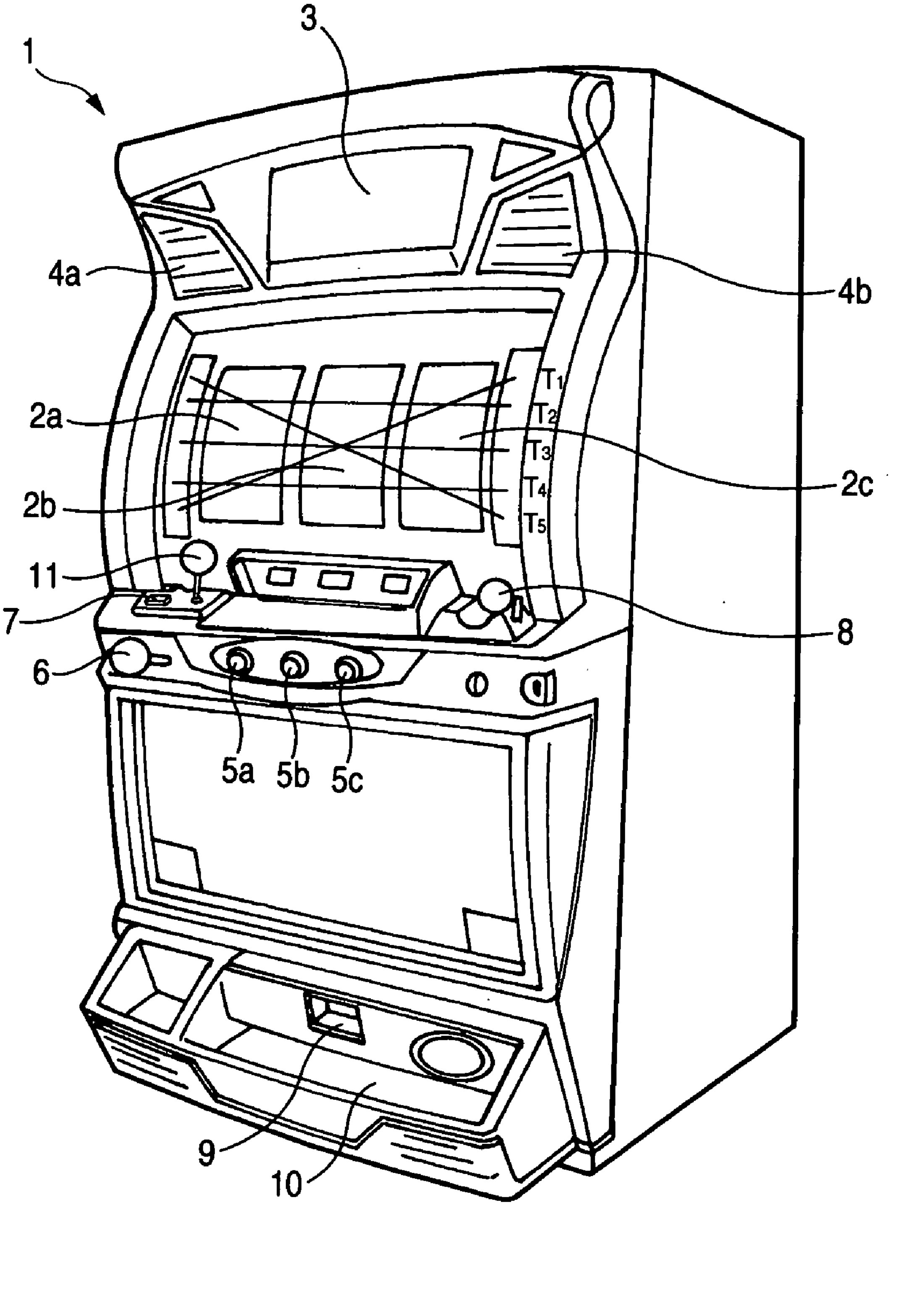
FIG. 1 is a perspective view showing an external view of a slot machine to which the invention is applied.

Before description of the embodiment, a configuration of the slot machine to which the embodiment is applied will be briefly described with reference to FIGS. 1 and 2. FIG. 1 is a perspective view showing an overview of a slot machine to which the invention is applied, and FIG. 2 is a descriptive view showing winning combinations of the slot machine. As shown in FIG. 1, display windows 2*a*, 2*b*, 2*c* are disposed on the front face of the slot machine. Each display windows 2*a*, 2*b*, 2*c* display a predetermined number of symbols printed on a corresponding spinning reel. A liquid-crystal display 3 and speakers 4*a*, 4*b* are provided in an upper portion of the front face. Stop buttons 5*a*, 5*b*, 5*c* assigned to the respective spinning reels, a start lever 6, a bet button 7, a game token insert slot 8, and a joystick 11 are provided below the display windows 2*a* through 2*c* of the slot machine. A game token receiver 10 is disposed below the slot machine. The game token receiver 10 stores game tokens for payoff output from a game token output port 9.

The first through third spinning reels are disposed horizontally side by side along a single axis behind the respective display windows 2*a* through 2*c* and are rotatably supported. Symbols such as "CHERRY," "WATERMELON," "BELL," "7," and "BAR" are printed on an outer circumference of each of the first through third spinning reels. The slot machine is set so as to form a win by any one of the winning combinations shown in FIG. 2. A total of five valid pay lines T1 through T5; that is, three horizontal lines, a right diagonal line, and a left diagonal line, are printed across the faces of the display windows 2*a* through 2*c* of the three spinning reels. The number of valid pay lines can be increased in accordance with the number of game tokens inserted (the number of tokens bet). The slot machine shown in FIG. 1 is a rotary slot machine which rotates spinning reels by a motor. The invention can also be applied to a video-type slot machine which enables a player to play a game by spinning reels displayed on a liquid-crystal screen.

Figure 3:
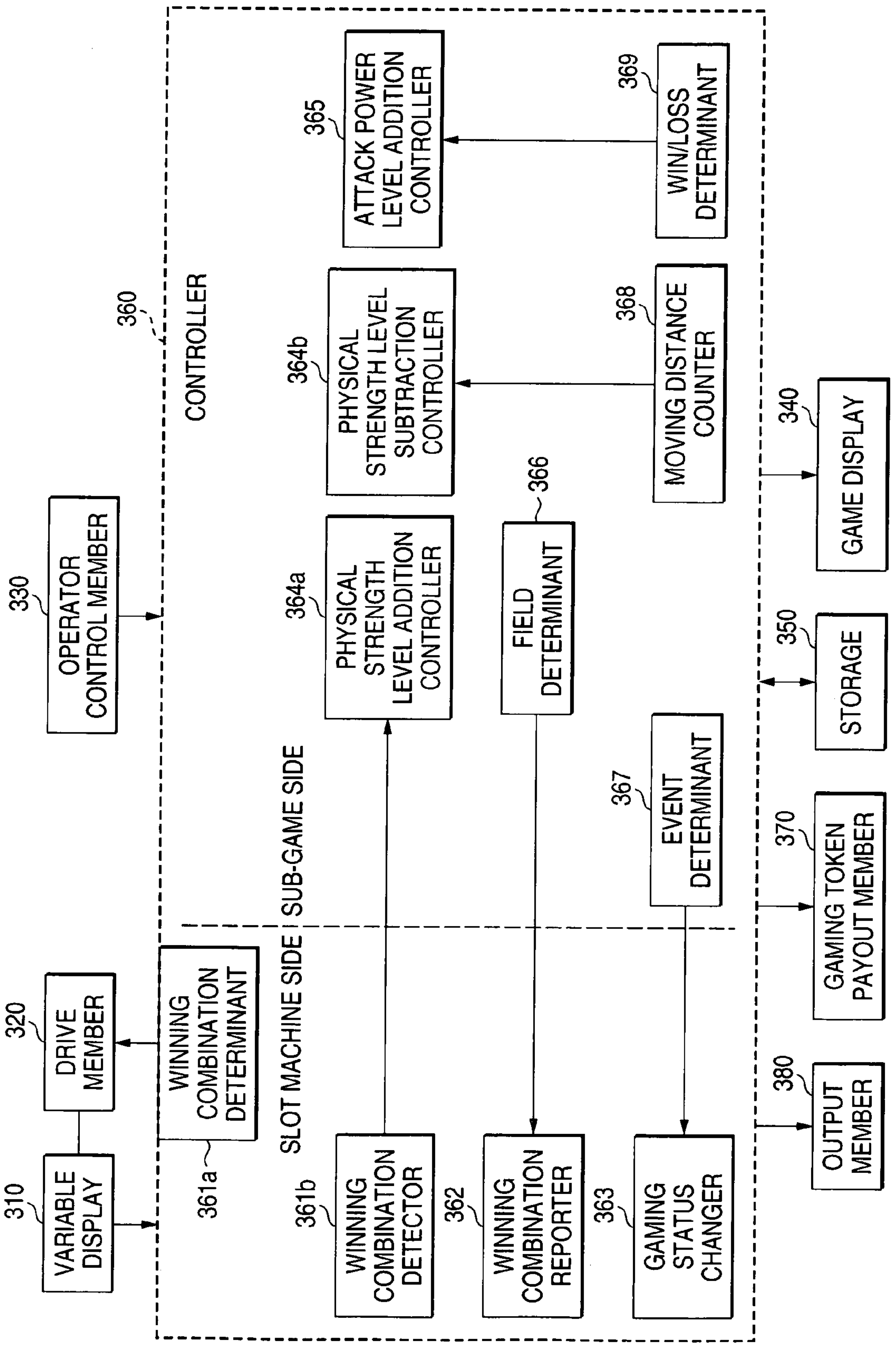
FIG. 3 is a block diagram showing a slot machine according to one embodiment of the present invention.

FIG. 3 is a schematic diagram of a slot machine according to one embodiment of the invention. In the drawing, the slot machine of the embodiment includes a variable display 310, a drive member 320, an operator control member 330, a game display 340, a winning combination determinant 361*a*, a winning combination detector 361*b*, a winning combination reporter 362, a game status changer 363, a physical strength level addition controller 364*a*, a physical strength level subtraction controller 364*b*, an attack power level addition controller 365, a field determinant 366, an event determinant 367, a controller 360 having a moving distance counter 368 and a win/loss determinant 369, a storage 350, a game token payout member 370, and an output member 380.

The drive member 320 is embodied by a stepping motor or the like and drives spinning reels, on whose peripheral faces a plurality of types of symbols are printed, in accordance with a drive pulse signal supplied from the controller 360. The variable display 310 is embodied, by the display window 2 and a predetermined number of symbols which are printed on the respective spinning reels and which are to come up on the display window 2. When the spinning reels have come to a standstill, a predetermined number of symbols (e.g., three symbols) are displayed on the display window 2 for each of the respective spinning reels. Further, the game display 340 is embodied by the liquid-crystal display 3 shown in FIG. 1, a CRT monitor, or the like. The game display 340 displays a game in which a character performs actions on a virtual field in accordance with a signal output from the controller 360.

The operator control member 330 is embodied by the three stop buttons 5, the start lever 6, the bet button 7, and the joystick 11, which enables an input in four or eight directions. Upon receipt of an operation entered by the player, the operator control member 330 controls initiation or halt of rotation of the spinning reels of the slot machine, or controls actions of the character displayed on the game display 340. Here, the bet button 7 to be used for playing a game displayed on the variable display 310 or a like button may be allocated to the operation button to be used for playing a game displayed on the game display 340. Alternatively, a specific, unillustrated button may be employed.

The controller 360 is embodied by a CPU or the like and performs computing operations, such as a spinning reel drive control, various display control operations, control of a progress in a game of a slot machine, and control of a progress in a game displayed on the game display 340. The winning combination determinant 361 a determines beforehand symbols that form a winning combination, through internal random selection. When the spinning reels have come to a standstill as a result of the player having pressed the stop buttons 5*a*, 5*b*, and 5*c*, the winning combination detector 361*b* detects symbols that form a winning combination along at least one of valid pay lines of the variable display 310 when the spinning reels are stopped.

When the winning combination detector 361*b* detects that symbols that form a certain winning combination along at least one of the valid pay lines of the variable display 310 in the state of stopping the spinning reels, points corresponding to the detected symbols are added to a physical strength level assigned to the character in the virtual field displayed on the game display 340. The event determinant 367 determines events in a game which the character in the virtual field displayed on the game display 340 is to encounter.

When an event determined by the event determinant 367 is cleared, the game status changer 363 changes a selection table, which is to be used for internal random selection, to another selection table advantageous to the player, changes to a big bonus game a determination made in advance through internal random selection or the game status changer 363 changes a normal game to a promotional game in which an afforded payment is greater than that of the normal game such as a bonus game and a future game. The moving distance counter 368 counts a distance over which the character in the virtual field displayed on the game display 340 is to move on the virtual field in the game. The physical strength level subtraction controller 364*b* subtracts from the physical strength level assigned to the character points determined by the moving distance counted by the moving distance counter 368.

The field determinant 366 determines whether or not the character is in a predetermined field in the game. When the field determinant 366 determines that the character is in the predetermined field in the game, the winning combination reporter 362 notifies, to the player by the output member 380, symbols that form a winning combination and have been determined in advance through internal random selection in a game to be played on the variable display 310. The win/loss determinant 369 determines whether or not the character in the virtual field displayed on the game display 340 has defeated enemy characters. When the win/loss determinant 369 determines that the character in the virtual field displayed on the game display 340 has defeated the enemy characters, the attack power level addition controller 365 adds to the attack power level assigned to the character points determined from the types of the enemy characters. Here, the winning combination detector 361*b*, the winning combination reporter 362, the game status changer 363, the physical strength level addition controller 364*a*, the physical strength level subtraction controller 364*b*, the attack power level addition controller 365, the field determinant 366, the event determinant 367, the moving distance counter 368, and the win/loss determinant 369 are embodied by a program which is to be executed by the controller 360 (a CPU or the like).

The storage 350 is implemented by volatile or non-volatile semiconductor memory (e.g., RAM, ROM, EEPROM, or flash memory). For instance, the storage 350 stores various types of game programs, a display control program, various types of video data sets, sound data, and setting data pertaining to various games. When symbols that form a combination along at least one of the valid pay lines on the variable display 310 in the state of stopping the spinning reels corresponds to symbols that form winning combination determined in advance through internal random selection, the game token payout member 370 pays game tokens in a number determined in accordance with the winning combinations. The output member 380 notifies, to the player, the symbols that form a winning combination and that have been determined through random selection by the winning combination determinant 361*a*. The output member 380 is implemented by, e.g., the speaker 4, a liquid-crystal display, or a dot-matrix display.

Processing to be performed by the slot machine of the embodiment including the foregoing constituent elements will now be described. First, in a normal game status of the slot machine, if the winning combination detector 361*b* detects that symbols are formed with a small winning combination, such as "WATERMELON-WATERMELON-WATERMELON" shown in FIG. 2, along at least one of the valid lines of the variable display 310, fifteen game tokens assigned to the small winning combination symbols are paid out by the game token payout member 370. Simultaneously, the physical strength level addition controller adds 15 points (e.g., points equal in number to game tokens to be paid out) to the physical strength level (HP: hit point) of a character manipulated by the player (hereinafter called a "main character"). Here, in a normal game status, any one of a plurality of winning combinations or a failure is determined. Winning combinations include a big win in which the player can play a game in a game status which is higher in probability of occurrence of a win than the normal game status from the next game, only for a predetermined game period (i.e., a high probability game status; a big bonus game consisting of a small-winning-combination game and a regular bonus game); a medium win in which the player can play a game in a special game status (i.e., a regular bonus game) from the next game only for a predetermined game period; a small win in which game tokens are paid out in accordance with winning combinations; and a replay in which the player can play a game without betting, only for the next game, with the same number of game tokens bet as those bet in the previous game.

As the physical strength level of the character increases to a certain extent, the player plays a game by manipulating the main character in a virtual field displayed on the game display 340 by the operator control member 330. When the main character has moved over the virtual field displayed on the game display 340, the moving distance counter 368 counts the distance over which the main character has moved. The physical strength level subtraction controller 364*b* subtracts, from the physical strength level of the main character, points determined by the moving distance counted by the moving distance counter 368.

As a result, the player can be inhibited from putting his/her efforts only into the game displayed on the game display 340 rather than into the main game unique to the slot machine, which would otherwise bring the main game into a more advantageous status. Alternatively, a setting may be effected such that a given physical strength level is not imparted unless a main game of the variable display 310 is played a certain number of times or such that a physical strength level is subtracted until the main game of the variable display 310 has been played for a given period of time. As a result, the player can be inhibited from avoiding play of a main game from the beginning or plunging into a game displayed on the game display 340 while interrupting the main game of the variable display 310 for a long period of time.

In addition to the physical strength level, which leads to a game end when having decreased to zero, An attack power (AP) level is assigned to the main character. The attack power (AP) level represents damage points which can be imparted to an enemy character through a single attack. The main character encounters an enemy character at a certain probability by the event determinant 367, and a battle is initiated. In the battle, the main character and the enemy character battle by turn, thereby physical strength levels of the main character and the enemy character are diminished. When the physical strength level of the enemy character has decreased to zero, the win/loss determinant 369 determines a win for the main character. When the win/loss determinant 369 determines that the main character has defeated the enemy character, the attack power level addition controller 365 adds to the physical strength level of the main character the points determined by the type of the enemy character.

Alternatively, an empirical value in accordance with the power of the enemy character may be awarded to the player when the win/loss determinant 369 determines that the enemy character has been defeated. When the empirical value has reached a certain level, the attack power level addition controller 365 may increase an attack power level of the main character. Alternatively, there may be used an item or magic power which has the effect of increasing (incrementing) an attack power level and a physical strength level during a battle. Such an item or magic may be acquired during the course of a game. Alternatively, symbols representing items and magic powers may be printed on spinning reels of the slot machine. When item symbols or magic symbols are stopped along at least one of the valid pay lines of the variable display 310, there may be acquired an item or magic power which can be used in a game.

When the win/loss determinant 369 determines that the enemy character has been defeated, the player may acquire points in accordance with the power of the enemy character. When the points have reached a predetermined level, the game status changer 363 may set a BB winning combination—which is higher than a normal game in terms of the number of wins achievable through a regular bonus game (hereinafter simply called an "RB game")—in a big bonus game (hereinafter simply called a "BB game") of the slot machine, through internal random selection or may increase the number of games to be played during a period of an assist time.

Figure 4:
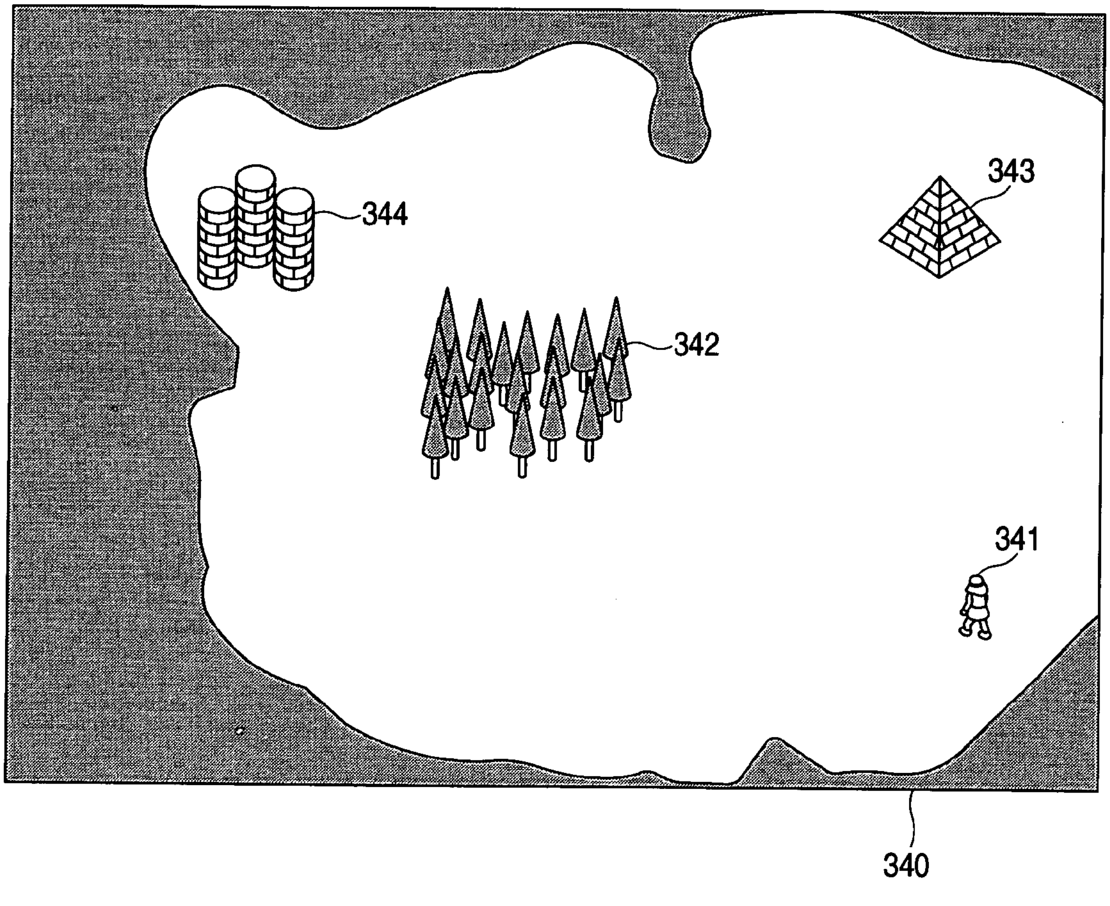
FIG. 4 is a descriptive view showing a virtual field displayed on a game display 340.

As shown in FIG. 4, the field determinant 366 determines that a main character 341 is in a special forest 342 or a pyramid 343 within the virtual field displayed on the game display 340. In such a case, the winning combination reporter 362 notifies, to the player, symbols that form a small winning combination and have been determined in advance through internal random selection by the slot machine, by the game display 340 or the output member 380. As a result, the player can form the thus-notified combinations by the pinpoint stopping technique while operating the stop buttons 5. Hence, the player can increase the number of acquirable game tokens.

In the embodiment, the field determinant 366 determines that the main character 341 is in the special forest 342 or the pyramid 343 within the virtual field displayed on the game display 340. In such a situation, the winning combination reporter 362 notifies, to the player, symbols that would form a small winning combination and have been determined in advance through internal random selection by the slot machine, by way of the output member 380 or the like. For instance, when the field determinant 366 determines that the main character 341 is in a specific field, such as the special forest 342 or the pyramid 343 in the field, the game status changer 363 may set the slot machine such that a game changes a normal game status to a replay time during which symbols that would form a replay game are determined with a high probability. Alternatively, when the field determinant 366 determines that the main character 341 is in the specific field, the game status changer 363 may set the slot machine such that a game changes a normal game to the promotional game such as the bonus game and the future game. In this way, the only requirement is that the game status of the slot machine is to be changed when the main character 341 is determined not to be in the specific field within the virtual field displayed on the game display 340.

Next, the main character in the virtual field displayed on the game display 340 defeats a final enemy character situated in a special location (a castle 344 or the like), which is a goal of the game, as a result of the event, thus saving a princess. In such a situation, the game status changer 363 determines a BB winning combination in advance through internal random selection in the slot machine. Alternatively, in place of advanced determination of a BB winning combination through internal random selection in the slot machine, a game of the slot machine may be changed to a BB game. Moreover, settings pertaining to the number of wins acquirable through an RB game in a BB game may be changed so as to become advantageous to the player, or a predetermined number of game tokens may be paid out. Further alternatively, when the main character in the virtual field defeats a final enemy character situated in the special location, the game status changer 363 may set the slot machine so as to change a normal game to the promotional game such as the bonus game and the future game. Incidentally, when the main character defeats the final enemy character in the virtual field, the game status changer 363 may set the slot machine so as to bring the player all game tokens which are pooled in the slot machine, in which the pooled game tokens are amount of the game tokens which other players bet to play the slot machine.

As described above, according to the slot machine of the embodiment, the game display 340 displays a game. The player manipulates the character by way of the operator control member 330. When the event encountered by the character by the event determinant 367 is cleared, the game status changer 363 changes a random selection table to be used for random selection performed by the winning combination determinant 361*a* to a game status advantageous to the player; for example, a high-probability game status in which a win is achieved at higher probability than in a normal game status through random selection, or changes the game status of the game machine to another game status in which a large number of game tokens are acquirable, such as a big bonus game. Hence, there can be effected settings such that even a beginner player who has not mastered the pinpoint stopping technique or a like technique can change the game status of the slot machine to a big bonus game, by the technique of operating a game appearing on the game display 340. Consequently, the player can increase the number of acquirable game tokens by playing a big bonus game. Further, potential customers who are good at playing games but have no experience in playing a slot machine can be attracted to an amusement arcade or a casino where the slot machines are installed. Hence, the amusement arcade or the casino where the slot machines are installed can expect an increase in profits.

When the winning combination detector 361*b* detects that the symbols constituting a combination along at least one of the valid lines of the variable display 310 in the state of stopping the spinning reels are symbols that form a winning combination, the physical strength level addition controller 364*a* adds to the physical strength level assigned to the character points determined by a kind of winning combinations of the symbols detected by the winning combination detector 361*b*. Consequently, the game to be played on the variable display 310 can be made a game which affects a progress in a game displayed on the game display 340. A manager of a parlor where the slot machines are installed, such as an amusement arcade, a casino and a PACHINKO parlor, can adjust so as to maintain a balance between a game to be played on the variable display 310 and a game displayed on the game display 340, thereby preventing the player from playing only games displayed on the game display 340 in an unbalanced manner.

When the field determinant 366 determines that the main character is in a predetermined virtual field in a game, the winning combination reporter 362 notifies, to the player, the symbols that form a winning combination determined in advance through internal random selection. Hence, even a beginner player who has not mastered a pinpoint stopping technique or a like technique can increase the number of game tokens which can be acquired through a game to be played on the variable display 310.

What is claimed is:

1. A game machine comprising;

a first display, displaying a plurality of spinning reels, each reel having a plurality of symbols;

a second display, displaying a battle on a role playing game in which a character as an object of operation for a player acts in a virtual field and aims at a predetermined target;

an operating section, configured to operate the character in battle on a the role playing game displayed on the second display; and a game changer, which changes a first game to a second game advantageous to the player on the first display, depending on whether or not the character as the operation object has achieved the predetermined target, said game machine further comprising:

a first determinant, which determines whether combinations formed with the symbols are at least one of winning combinations when the reels are stopped;

a payout controller, which pays game tokens when the symbols determined by the first determinant form at least one of winning combinations, a first point addition controller, which adds a first point to a first parameter of the character when the symbols determined by the first determinant form at least one of winning combinations;

a moving distance counter, which counts a moving distance of the character in the virtual field; and a point subtraction controller, which subtracts a second point from the first parameter of the character when the moving distance counter counts the moving distance of the character in the virtual field.

2. The game machine as set forth in claim 1, wherein the second game is a promotional game in which an amount of a payout being afforded is more than an amount of a payout of the first game.

3. The game machine as set forth in claim 1 further comprising an event generator, which generates an event to be encountered by the character.

4. The game machine as set forth in claim 1, further comprising a third determinant, which predetermines a winning combination of the symbols by an internal random selection; and a notice controller, which notifies the winning combination of symbols predetermined to the player by the third determinant when specific event is occurred in the role playing game.

5. The game machine as set forth in claim 1, further comprising a motor rotating the spinning reels displayed on the first display.

6. The game machine as set forth in claim 1, wherein the first display comprises an electronic display for displaying the spinning reels on a display screen.

7. A game machine as claimed in claim 1, wherein said first game is a basic game and said main character is directly controlled by a player during a basic game.

8. A game machine comprising;

a first display, displaying a plurality of spinning reels, each reel having a plurality of symbols;

a second display, displaying a role playing game in which a character as an object of operation for a player acts in a virtual field and aims at a predetermined target;

a game changer, which changes a first game to a second game advantageous to the player on the first display, depending on whether or not the character as the operation object has achieved the predetermined target, and an event generator, which generates an event to be encountered by the character, wherein the event is a battle on the role playing game; and the game machine further comprising a determinant, which determines whether an enemy character on the role playing game is defeated by the character through the battle; and a point addition controller, which adds a point to a parameter of the character when the enemy character determined by the determinant is defeated.

* * * * *